1,808,159

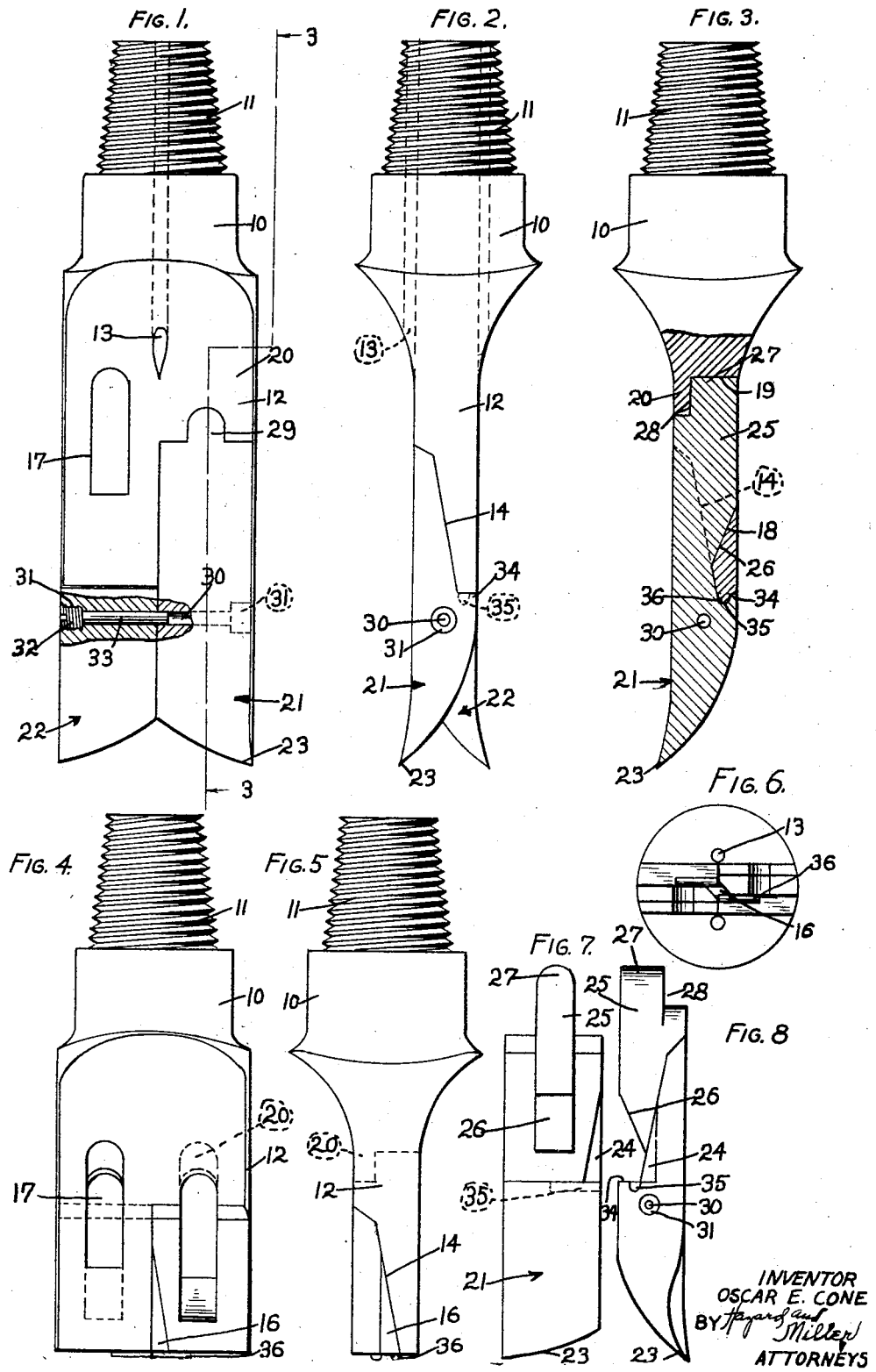
June 2, 1931.   O. E. CONE   1,808,159
FISH TAIL BIT
Filed Aug. 8, 1928
INVENTOR
OSCAR E. CONE
BY Hazard and Miller
ATTORNEYS Patented June 2, 1931

UNITED STATES PATENT OFFICE

OSCAR E. CONE, OF TAFT, CALIFORNIA

FISH TAIL BIT

Application filed August 8, 1928. Serial No. 298,209.

This invention relates to improvements in fish tail bits. An object of the invention is to provide an improved fish tail bit, having removable or detachable blades or cutters, so that the parts of the bit, which provide the cutting edges, can be easily and quickly removed and replaced without delay.

Another object of the invention is to provide an improved fish tail bit, having detachable cutters, which can be easily and quickly applied and detached, and which are so constructed that they cannot be easily torn off or dismounted from the body of a bit while in a well hole.

A further object of the invention is to provide a fish tail bit, having detachable blades, which are so attached to the body of the bit that they cannot easily become "frozen" in place and thus render detachment difficult.

Another object of the invention is to provide a fish tail bit having detachable blades, which blades are interchangeable.

With the foregoing and other objects in view, which will be made manifest in the following detailed description and specifically pointed out in the appended claims, reference is had to the accompanying drawings for an illustrative embodiment of the invention, wherein:

Figure 1 is a front view in elevation, parts being broken away and shown in vertical section of the improved fish tail bit, Fig. 2 is a view in elevation of the same, Fig. 3 is an end view of the bit, parts being broken away and shown in vertical section and this view may be considered as being taken upon the line 3—3 upon Fig. 1, Fig. 4 is a front view in elevation of the body of the bit, the blades or cutters having been removed, Fig. 5 is a view in elevation of the body, shown in Fig. 4, Fig. 6 is a bottom plan view of the body, shown in Figs. 4 and 5, Fig. 7 is a view in elevation, illustrating one of the blades or cutters, this view showing the back side of the cutter, Fig. 8 is a view in end elevation of the cutter, shown in Fig. 7, Referring to the accompanying drawings, wherein similar reference characters designate similar parts throughout, the improved fish tail bit consists of a body 10, having at its upper end the conventional threaded pin 11 and having its lower portion thinned and flattened as indicated at 12, providing front and back faces.

The conventional circulation ports or passages 13 are formed in the body, which terminate on the face and provide for the discharge of circulation fluid. Each face of the body of the bit has its right hand half recessed as indicated at 14, these recesses being approximately rectangular in cross section, as shown in Fig. 6, but having their inner opposed corners oblique, forming a connecting web 16, which connects the portions of the body forming the backs of the recesses for purposes of strength.

Centrally of each recess, and at the back thereof, there is formed an aperture 17 and each aperture has its bottom upwardly and inwardly inclined as indicated at 18. The top of each aperture indicated at 19 extends upwardly into the body above the top of its recess 14, so that there is a depending lip 20 formed on the body above each recess 14.

Two blades, generally designated at 21 and 22, are provided, each blade presenting at its bottom a cutting edge 23, corresponding to the cutting edge on any conventional form of fish tail bit. The bodies of the blades are so formed on their back sides that they will fit in the recesses 14, having their inner rear corners beveled away, as indicated at 24, so as to fit against the connecting web 16. On the back of each blade there is formed a vertical rib, or projection 25, which has its bottom downwardly and forwardly inclined, as indicated at 26, so that they will fit against the upwardly and inwardly inclined bottom of the aperture 17. The rib 25, extends upwardly, forming an upstanding projection 27, which is preferably rounded at its top, so as to fit at the top 19 of the aperture 17.

The forward side of the rib 25 near the top is cut away as indicated at 28 upon Fig. 8, so that the forward side of the projection 27 can fit against the depending lip 20. The forward side of the rib 25, however, is not completely cut away, so that on the forward side of the blade there is an upstanding projection 29, which fits in a small recess at the top of the recess 14. On the back of each blade there is formed a horizontal shoulder 34 which abuts against the bottom of the body or shank 12 of the tool. On this shoulder there is formed a latterly extending groove 35 which extends from the inner edge of the blade outwardly a distance equal to approximately one-third or more of the width of the blade. A corresponding or complementary lip or bead 36 is formed on the bottom of the body 12 adapted to fit the groove.

A bore 30 is formed in each blade and extends horizontally therethrough from edge to edge. Each bore has its outer end enlarged and internally threaded as indicated at 31, to receive a threaded plug 32, which carries a pin 33 fitting within the bore. The plug 32 and the pin 33 combined are greater in length than the width of either of the blades 21 or 22, so that when the plug and pin are in position the pin not only extends through the bore in the blades on which it is mounted, but will also extend into the adjacent blade.

The assembly of the bit is as follows: Assuming that face of the body shown in Fig. 1 as being the front of the bit, a blade is taken and moved bodily upwardly and rearwardly, so that rib 25 ends the aperture 17. When it is moved upwardly and rearwardly in this manner to practically as far as it will go, the lower end of the blade is then swung rearwardly, causing the downwardly and forwardly inclined surface 26, to engage the surface 18. At the same time the lip or bead 36 is caused to enter and fit in the groove 35. When in such position the blade can neither be removed by being moved horizontally forward or backward, nor can it vertically drop out of the body. The bearing surfaces afforded by the lip 20, the inclined surface 18 and the back of the recess 14 are amply sufficient to prevent the blade from being torn loose from the body while the bit is rotating at the bottom of a well hole. The purpose of the lips or beads 36 and their corresponding grooves 35 in the blades is to prevent the blades from being torn off of the body in the event that the driller reversely rotates the bit while the bit is resting on the body of the hole. In other words, during certain drilling operations it is customary for the driller to reversely rotate, and sometimes he negligently fails to lift the bit off of the bottom. The beads and grooves prevent the blades from being torn off such rotation and prevent any danger of the pin 33 being sheared off.

To prevent the blades from being removed from the body while the bit is being lowered, the plug 32, with its pin 33, is inserted into the bore 30, locking the blades to each other and to the body of the bit. However, this pin merely serves to lock the blades in position so that they will not drop off on lowering the bit into the well hole. This pin is not designed to sustain a great amount of shear, and hence the beads and grooves are employed.

From the above described construction it will be appreciated that a novel form of fish tail bit is provided, having detachable blades, enabling the blades to be easily and quickly attached or detached, so that the portion of the bit providing cutting edges can be easily and quickly replaced. In this manner new cutting edges can be provided on the bit without delay, while the old worn blades can be built up or repaired. The form of the projections and recesses on the blades and the body is such that the blades are to a certain extent self-locked in position on the body when applied. Furthermore, the formation of the projections and recesses is such that there is little danger of the blades being "frozen" or stuck to the body. If such sticking should attempt to take place, the heel of the blade can be struck with a hammer, and this will ordinarily be sufficient to knock the blades loose.

Various changes may be made in the detail of construction without departing from the spirit or scope of the invention as defined by the appended claims.

I claim:

1. A fish tail bit comprising a body part, blade parts, there being complementary projections and recesses formed upon said parts, said recesses and projections being so formed that the blades may be applied by forcing their upper ends upwardly and rearwardly relatively to the body, and then swinging their lower ends rearwardly and upwardly, and means for connecting the blades to each other so as to lock them against removal.

2. A fish tail bit comprising a body, each face of which has its right-hand side recessed, a blade for each face adapted to fit in the recess, said body being apertured at the back of each recess, with the tops of the apertures extending above the tops of the recesses, each blade having a projection on its back adapted to enter and occupy the apertures, and means for preventing removal of the blades.

3. A fish tail bit comprising a body having a recess formed in the right-hand side of each face, there being apertures formed in the body at the backs of said recesses, the top of each aperture being above the top of its respective recess, the bottom of each aperture being downwardly and forwardly inclined, and blades adapted to fit in the recesses and having portions adapted to fit in said apertures, and means for locking the blades against removal.

4. A body for fish tail bits comprising a body generally conforming in shape to the body of a conventional fish tail bit, said body having apertures formed therethrough, the tops of which are higher at their backs than at their forward ends, there being recesses formed in the faces of the body about the forward ends of said apertures adapted to partially receive the blades.

5. A fish tail bit comprising a body, removable blades receivable upon the body against opposite sides thereof, and means receivable through one of the blades from one of its side edges and engaging the other blade, serving to lock the blades against removal from the body.

6. A fish tail bit comprising a body having upwardly and rearwardly extending apertures formed therein, blades adapted to be mounted upon the body having portions receivable in the apertures, and means connecting the blades to each other to lock them against removal from the body.

In testimony whereof I have signed my name to this specification.

O. E. CONE.